United States Patent [19]
Schoon

[11] 3,982,124
[45] Sept. 21, 1976

[54] ELECTRO-OPTICAL FEEDBACK SIGNAL PRODUCING APPARATUS

[75] Inventor: David J. Schoon, Marine on St. Croix, Minn.

[73] Assignee: Minnesota Mining and Manufacturing Company, St. Paul, Minn.

[22] Filed: Oct. 8, 1975

[21] Appl. No.: 620,635

Related U.S. Application Data

[62] Division of Ser. No. 466,975, May 6, 1974, Pat. No. 3,919,545.

[52] U.S. Cl. .......................... 250/237 R; 250/201; 250/216
[51] Int. Cl.² ........................................... H01J 3/14
[58] Field of Search......... 250/201, 202, 203, 237 R, 250/237 G, 216; 356/4, 5; 354/25

[56] References Cited
UNITED STATES PATENTS

| | | | |
|---|---|---|---|
| 2,766,653 | 10/1956 | Martin et al. | 250/201 |
| 3,893,129 | 7/1975 | Endo et al. | 250/201 |
| 3,919,545 | 11/1975 | Schoon | 250/237 R |

*Primary Examiner*—David C. Nelms
*Attorney, Agent, or Firm*—Alexander, Sell, Steldt & DeLaHunt

[57] ABSTRACT

Apparatus and circuitry for positioning a mirror at a desired position includes an electric to rotary motion transducer means connected with the mirror which is controlled by a signal obtained in response to an electrical positioning signal and a feedback signal derived from the actual mirror position. An electro-optical sensing means resonsive to the actual position of the mirror provides the feedback signal. The circuitry is automatically calibrated.

11 Claims, 3 Drawing Figures

ELECTRO-OPTICAL FEEDBACK SIGNAL PRODUCING APPARATUS

This is a division of application Ser. No. 466,975 filed May 6, 1974 now U.S. Pat. No. 3,919,545.

BACKGROUND OF THE INVENTION

1. Field of the Invention

The invention presented herein relates to electro-optical feedback signal producing apparatus for use in a control apparatus.

2. Discussion of the Prior Art

Positional accuracy and response speed in placing an object such as a scanning mirror at a desired location has been difficult to attain for any reasonable cost. Difficulty has been encountered in obtaining a signal indicative of the actual position of the object for use as a feedback signal. Open-loop mirror systems which use a galvanometer as the drive mechanism are available to which a velocity feedback coil is added to speed up the transient response. Positional accuracy and response speed are poor, however. A scanning mirror utilizing capacitance feedback is available, but is very costly.

SUMMARY OF THE INVENTION

The invention presented herein provides an electro-optical feedback signal producing apparatus for us in a control apparatus. The invention is, for example, usable with circuitry for placing an object such as a mirror at a desired position very rapidly and with a high degree of accuracy. The apparatus and circuitry includes an electric to motion transducer means connected with the mirror which is responsive to an electrical positioning input signal and a feedback signal which is directly related to the actual position of the mirror, the feedback signal being provided by an electro-optical sensing means responsive to the actual position of the mirror for providing the feedback signal.

The electric to motion transducer means may be an electric to rotary motion transducer which includes a pivotally mounted member connected with the mirror, a source of magnetic flux positioned adjacent a movable portion of the pivotally mounted member, a coil carried by the pivotally mounted member for coupling with the magnetic flux of the source of magnetic flux and a summing amplifier which receives the electrical positioning signal and the feedback signal to produce an error signal which is applied to the coil to position the pivotally mounted member and the connected mirror.

The electro-optical feedback signal producing apparatus for use in a control apparatus includes a light to electric transducer, a light source for directing light toward said light to electric transducer and a light shutter positioned to intercept the passage of light to the light to electric transducer in accordance with the operation of the control apparatus, the output of the light to electric transducer providing the feedback signal which is directly related to the operation of the control apparatus. The optical sensing means also includes means to distribute the light flux in a predetermined way at the plane of the light shutter. The amount of light flux received at the light to electric transducer is directly controlled by the position of the light shutter.

Since the output of the light source and the response of the light to electric transducer are subject to change, the apparatus of this invention includes calibration circuitry which provides for automatic calibration of the electro-optical sensing apparatus. The automatic calibration circuitry includes an inhibiting circuit which when placed in the calibration mode inhibits the control apparatus from responding to the electric positioning signal and feedback signal and allows the control apparatus to be positioned for calibration by the application of a calibrating mode current to the control apparatus. The automatic calibration portion of the circuitry also includes a light control circuit and a control point and memory circuit. The inhibiting circuit when placed in the calibration mode allows the control point and memory circuit to respond to the output of the light to electric transducer to establish the point of operation of the light control circuit. When the inhibiting circuit is placed in the scanning mode, the memory circuit maintains the point of operation of the light control circuit which was established during the previous calibration mode.

BRIEF DESCRIPTION OF THE DRAWING

The invention will be understood and its various advantages will become apparent from the description to follow given in conjunction with the accompanying drawing wherein like numerals refer to like elements and wherein.

DESCRIPTION

Figure 1:
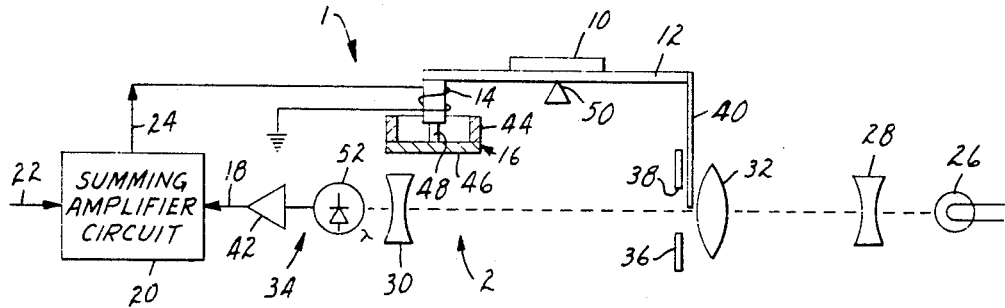
FIG. 1 is a schematic of apparatus and circuitry for positioning a mirror which embodies the invention.

Referring to the drawing, the invention is embodied in the apparatus and circuitry shown in FIG. 1 which serves to rapidly and accurately place an object such as a mirror 10 at a desired position in response to an electrical positioning input signal presented at input 22 and a feedback signal presented at input 18. The feedback signal is directly related to the actual position of the mirror. The apparatus and circuitry includes an electrical to motion transducer means 1 illustrated as an electrical to rotary motion transducer, connected with the mirror 10 for placing the mirror in a position in response to the aforementioned signals and an electro-optical sensing means 2 responsive to the actual position of the mirror 10 for providing the feedback signal which varies directly with the actual position of the mirror 10. The transducer means 1 is connected to mirror 10, so the position of mirror 10 is determined by the position of the transducer means 1. The transducer means 1 includes a pivotally mounted member 12, a coil 14 carried on a mandrel secured to one end portion of member 12 and a magnetic flux source 16. In the embodiment of FIG. 1, the mirror 10 is carried directly by member 12 and is positioned above the pivot point 50 for member 12 so mirror 10 is moved about pivot point 50 as member 12 is moved. The electro-optical sensing means 2 includes a light source 26, light to current transducer 34, and a light shutter operated by the movement of member 12. The light shutter is shown as including apertured wall 36 and a light vane 40 mounted for movement with member 12. The optical sensing means 2 also includes a light control means for receiving light from the light source 26 for presenting a predetermined light flux to the plane of the light shutter which in the structure shown is considered to be the vane 40. The light control means includes concave lens 28 and convex lens 32. The optical sensing means 2 is also shown to include second light control means provided by concave lens 30 which serves to collect the converging light from convex lens 32 passed by the light shutter for presentment to the transducer 34.

Coil 14 moves relative to the magnetic flux source 16 to establish the position of mirror 10 and light vane 40. Movement of coil 14 occurs when there is current flow in coil 14 with the acceleration determined by the amount of magnetic flux produced by coil 14 which either adds to or subtracts from the magnetic flux from source 16. The direction and magnitude of the current flow in coil 14 determines the amount of magnetic flux produced by coil 14 and whether it adds to or subtracts from the magnetic flux source 16.

Concave lens 28 with convex lens 32 provides a uniform light flux at the plane of vane 40. In this way, a linear relationship is obtained between the vertical position of vane 40 and the amount of light flux received at light to current transducer 34. The concave lens 28 serves to diffuse the light from the light source 26 so the lens 28 need not be used if a light source 26 is used which provides a source of diffused light flux.

The position of light vane 40 is in accordance with the position of mirror 10 and, as shown, serves to vary the amount of light from source 26 passed through the aperture 38 in wall 36 to the light to electric current transducer 34 causing the output of transducer 34 to be indicative of the position of mirror 10. The transducer 34 may include a photodiode 52 and an amplifier 42 connected to the output of the photodiode. The output of amplifier 42 provides the feedback electrical signal indicative of the actual position of mirror 10.

The apparatus and circuitry of FIG. 1 also includes a summing amplifier circuit 20 having input 22 to which the electrical input signal used to establish a desired position for mirror 10 is applied. Another input 18 is provided by amplifier circuit 20 to which the feedback signal from the output 41 of amplifier 42 is applied. The output 24 of amplifier circuit 20 is an error signal which is applied to coil 14. The summing amplifier circuit 20 provides an error signal at output 24 to cause current to flow in coil 14 when a difference exists between the positioning signal at input 22 and the feedback signal at input 18. Accordingly, if no difference in these signals exists, the coil 14 is at the desired position. If a difference exists, such difference is reflected in the magnitude and polarity of the signal at output 24. The magnitude of the output signal at 24 is indicative of the absolute difference between the signals at inputs 18 and 22, while the polarity of the output signal at 24 is indicative of whether the feedback signal at input 18 is greater or less than the positioning signal at input 22. The coil 14 is wound in the direction necessary to cause the magnetic flux established by current flow in coil 14 to be such that coil 14 moves in accordance with the output or error signal at 24 to cause the feedback signal from transducer 34 to be equal and opposite to the positioning signal at input 22 thereby positioning mirror 10 at the position desired as selected by the mirror positioning input signal provided at 22.

Considering the apparatus of FIG. 1 in greater detail, the magnetic flux source 16 may include a permanent annularly formed magnet 44, which is shown in cross-section in FIG. 1, with a keeper 46 positioned across the end of magnet 44 opposite the end in which the coil 14 is positioned. A pole piece 48 is positioned axially within magnet 44 on keeper 46 and extends toward the coil 14. Thus, if the upper end of magnet 44 is a north pole, the pole piece 48 will have a south pole induced as its upper end. The mandrel on which coil 14 is wound is non-magnetic and can be a paper tube, for example. The mandrel is positioned so it moves coaxially to the pole piece 48. The path for magnetic flux includes the pole piece 48, the air gap from the free end of pole piece 48, magnet 44 and keeper 46 back to the other end of pole piece 48. The magnetic flux created by current flow in coil 14 will either add to or subtract from magnetic flux due to the magnet 44. The direction of movement of coil 14 with respect to the pole piece 48 is dependent on the direction of current flow in coil 14 while the degree of movement is dependent on the magnitude of such current flow. As has been indicated, the magnitude and direction of the current in coil 14 is determined by the signal presented at the output 24 of amplifier circuit 20 which in turn is determined by the difference between positioning and feedback signals at inputs 22 and 18 respectively, of circuit 20.

Referring to the optical sensing means 2 in greater detail, the light source 26, which, for example, may be a miniature incandescent lamp or light emitting diode, emits light along and around its axis to the concave lens 28 which serves to distribute this light more evenly over the solid angle subtended by the convex lens 32 which acts to present a spatially uniform light flux at the aperture 38. The aperture 38 and the movable vane 40 combine to form a variable light stop or shutter which determines how much light flux from lens 32 reaches the photodiode 52 via the concave lens 30. The light flux reaching the photodiode 52 is very closely proportional to the vertical position of the vane 40 when the aperture 36 is shaped to a good approximation, like a rectangle. This being the case, the vertical position of vane 40 is very nearly proportional also to the angular displacement or position of mirror 10 since the vertical position of vane 40 is determined by the position of member 12 which also determines the angular displacement of mirror 10. The use of the aperture 38 provides a means for correcting for inaccuracies known to occur since the aperture can be shaped to provide the necessary compensation. For example, it can be shaped to compensate for the absorption of light by the lens or for photodiode nonlinearities. In the case where the mirror is used in a scanning apparatus for scanning a flat surface, the aperture can be shaped with its sides slightly curved to compensate for the optical distortion introduced by the shortened projections at viewing angles displaced from the normal to the surface.

A very nearly linear relationship between angular displacement of mirror 10 and light flux reaching photodiode 52 is obtained by having the light flux at vane 40 as uniform as possible and adjusting the physical position of photodiode 52 relative to lenses 30, 32, and 28 such that photodiode 52 is in the image plane of the light source 26. As in the case of concave lens 28, the concave lens 30 may not be required if the photodiode 52 or similar transducer provides a full response to the light passed via aperture 38 without having to use a lens to collect the light and converge it prior to its impinging on the photodiode 52.

The mirror 10 is shown carried on member 12 and is positioned over the pivot point 50 for member 10. It can be appreciated that structure shown for member 12 with mirror 10 carried directly thereon can be readily modified. For example, the member 12 can be secured to a shaft mounted for rotational movement with the mirror carried on the shaft to place the mirror at a point removed from member 12. It is only necessary that the transducer means 1 provide a direct relationship between the movement of coil 14 and the rotational movement of the mirror 10 and movement of the vane 40.

Figure 2:
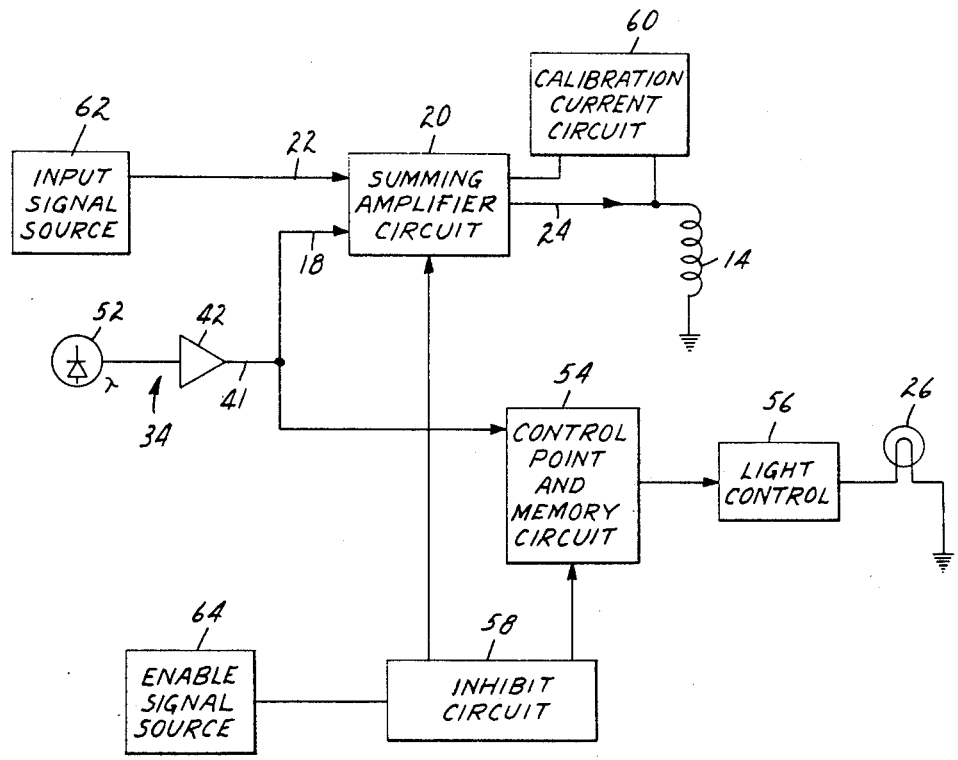
FIG. 2 is a schematic showing of a portion of FIG. 1 together with additional circuitry for providing automatic calibration of the apparatus and circuitry shown in FIG. 1.

Another aspect of the invention is concerned with the provision of a calibration means for providing periodic self or automatic calibration of the apparatus and circuitry of FIG. 1 to correct for variations such as changes in the light output from lamp 26 or in the response of photodiode 52. The circuitry required for providing such automatic calibration is schematically shown in FIG. 2 wherein portions of the basic apparatus and circuitry of FIG. 1 are represented together with the additional circuitry required for providing the automatic calibration function. The additional circuitry includes a control point and memory circuit 54, a light control circuit 56 and an inhibit circuit 58 and a calibration current circuit 60. The position input signal source 62 provides the position input signals to input 22 and the enable signal source 64 provides the control signals for the inhibit circuit 58.

The inhibit circuit, dependent on the signal received from the enable signal source 64a is placed in a calibration mode or in a scanning mode. When the inhibiting circuit 58 is in the calibration mode, amplifier 20 is prevented from providing an output at 24 in response to signals applied to its two inputs 18 and 22 and when inhibiting circuit 58 is in the scanning mode, circuit 54 is prevented from responding to the output 41 of amplifier 42 of the light to current transducer 34.

When the amplifier circuit 20 is inhibited, current to coil 14 is then obtained from the calibration current circuit 60. Though this is termed a calibration current circuit, it need not be a precise current. The current flow is of a direction and magnitude to cause the vane 40 to be positioned so light can pass via the entire opening presented by aperture 38. With amplifier circuit 20 so inhibited during the calibration mode, the control point and memory circuit 54 is enabled to respond to the output 41 of amplifier 42 to provide a signal to the light control 56 in accordance with output 41 for controlling the intensity of light source 26. An initial factory adjustment is made for operation of lamp 26 at its rated voltage. The signal presented to lamp control 56 during the calibration mode of operation will differ from that established by the initial factory adjustment of control point portion of circuit 54 if the output of photodiode 52 is different from that presented during the initial factory adjustment of the control point portion. An analog memory is provided in circuit 54 to store the signal presented to light control 56. When circuit 54 is inhibited by a signal from inhibit circuit 58 for the scanning mode of operation, the memory portion of circuit 54 functions to supply light control 56 with the control signal entered in the memory portion of circuit 54 during the calibration mode of operation.

Figure 3:
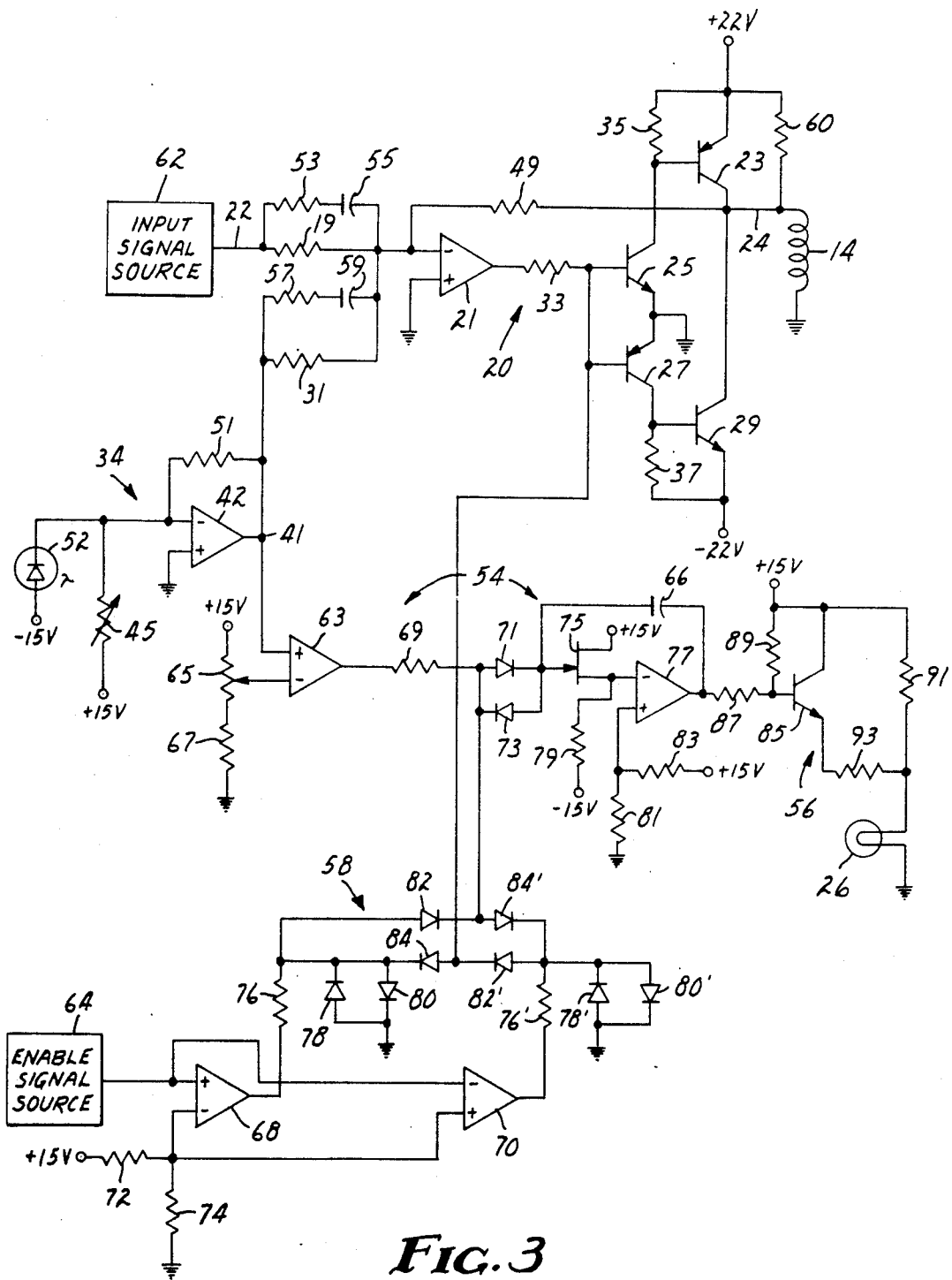
FIG. 3 is a schematic exemplary showing of circuitry details for the circuitry portions shown in FIG. 2.

Exemplary circuits which can be used in the arrangements shown in FIGS. 1 and 2 are shown in FIG. 3. A more complete understanding of the operation of the circuitry of FIG. 2 will be obtained by considering the circuits of FIG. 3 in detail. That portion of the circuitry of FIG. 3 which provides the circuitry functions of the summing amplifier 20 and amplifier 42 of the arrangement shown in FIG. 1 will be considered first.

The summing amplifier circuit 20 includes the operational amplifier 21, the PNP type transistors 23 and 27 plus the NPN type transistors 25 and 29. The input signal to input 22 of amplifier circuit 20 is applied to the inverting input of operational amplifier 21 via a resistor 19. The feedback signal from the output 41 of amplifier 42 of the light to current transducer 34 is applied to the same input of amplifier 21 via a resistor 31. The non-inverting input of amplifier 21 is connected to ground so amplifier 21 will not present a signal at its output if the signals applied to inputs 21 and 24 do not produce a current at the inverting input of amplifier 21. When this condition exists there is agreement between the desired and actual position of mirror 10. Any imbalance between the desired and actual position of mirror 10 will cause a non-zero or error signal output from amplifier 21 to be presented.

The output from amplifier 21 is coupled to the base of transistors 25 and 27 via a resistor 33. The emitters of these transistors are connected to ground. Transistors 23 and 25 serve to amplify a positive signal presented at the output of amplifier 21, while transistors 27 and 29 serve to amplify a negative output signal presented at the output of amplifier 21. The collector of transistor 25 and the base of transistor 23 are connected via a resistor 35 to a positive voltage source, shown as +22V. The emitter of transistor 23 is also connected to the positive voltage source. Transistor 23 conducts when transistor 25 is conducting and serves to amplify the conductive action of transistor 25. The collector of transistor 23 is connected to the output 24 of circuit 20 which is connected to the coil 14 so current output of transistor 23 is effective to alter the position of coil 14. Referring to FIG. 1, the coil 14 is wound so the current flow from transistor 23 will produce a magnetic flux which adds to the flux provided by magnetic flux source 16 causing the coil to move downward as viewed in FIG. 1.

When transistor 27 conducts in response to a negative signal presented at the output of amplifier 21, transistor 29 conducts to amplify the conducting action of transistor 27 since the base of transistor 29 and the collector of transistor 27 are connected via a resistor 37 to a negative voltage source, shown as −22V. The emitter of transistor 29 is also connected to the negative voltage source. The collector of transistor 29 is connected to the output 24 of circuit 20 which is connected to coil 14 so current flow in coil 14 due to conduction of transistor 29 is opposite to that caused by conduction of transistor 23. Accordingly, current flow in coil 14 due to conduction of transistor 29 produces magnetic flux which opposes the flux from magnetic flux source 16 thereby causing coil 14 to move upwardly as viewed in FIG. 1.

To complete circuit 20, a feedback resistor 49 is connected between the output 24 of circuit 20 to the inverting input of amplifier 21. In addition, a resistor 53 and a series connected capacitor 55 are connected in parallel with resistor 19. A resistor 57 and capacitor 59 are connected in a similar fashion across resistor 31. Resistors 53, 57 and capacitors 55, 59 provide feedforward compensation so as to properly damp the system.

FIG. 3 shows the light to current transducer 34 in greater detail. As shown, photodiode 52 has its anode connected to a negative voltage source, shown as −15V, while its cathode is connected to the negative input of amplifier 42 which has its positive input connected to ground. Negative input of amplifier 42 is also connected to a positive voltage source shown as +15V through variable resistor 45. A feedback resistor 51 is connected between the output of amplifier 42 and its negative input.

The circuitry described to this point with respect to FIG. 3 provides circuitry suitable for use in the arrangement shown in FIG. 1. The remaining circuitry of FIG. 3 is that which is needed to carry out the self or automatic calibration operation described in connection with FIG. 2. The control point and memory circuit 54 and lamp control circuit 56 will be described before considering the details of the inhibit circuit 58.

The control point circuit portion of circuit 54 includes an operational amplifier 63 and series connected potentiometer 65 and resistor 67 connected between ground and a positive voltage source shown as +15V. The adjustable contact of potentiometer 65 is connected to the negative input of the amplifier 63. The positive input for amplifier 63 is connected to the output 41 of amplifier 42 at which the feedback signal from the optical means 2 is presented. The potentiometer 65 is adjusted when the apparatus and circuitry of FIG. 2 is installed for use in equipment and in that sense is a factory type of adjustment.

The memory portion of circuit 54 includes a field effect transistor 75, operational amplifier 77 and capacitor 66. A resistor 69 connected in series with parallel connected and oppositely poled diodes 71 and 73 serves to couple the output of amplifier 63 to the gate of the field effect transistor 75 which has its drain electrode connected to the negative input of an operational amplifier 77. The drain electrode of transistor 75 is connected also to a negative voltage source, shown as −15V via a resistor 79. The source electrode of field-effect transistor 75 is connected to a positive voltage source, shown as +15V. The positive input of amplifier 77 is connected to a positive voltage provided at the connection common to series connected resistors 81 and 83 which are connected between ground and a positive voltage source, shown as +15V. The capacitor 66 is connected between the output of amplifier 77 and the gate of transistor 75 to complete the memory portion of circuit 54. The field-effect transistor 75 and amplifier 77 with capacitor 66 provide an integrating circuit having an extremely long time constant. The memory circuit portion of circuit 54 causes the output of amplifier 77 to continue to operate at the level it was operating upon termination of any input from amplifier 63 in response to the placement of the inhibit circuit 58 in the scanning mode of operation.

The output of amplifier 77 is connected to the base of an NPN type transistor 85 via a resistor 87. The transistor 85 is a part of the lamp control circuit 56 which serves to control the current flow through the lamp 26 in accordance with the signal presented to the base of transistor 85. A positive voltage source, shown as 15V, is connected to the collector of transistor 85 and is also connected to the base of transistor 85 via a resistor 89 and to one side of lamp 26 via a resistor 91. The emitter of transistor 85 is connected to the same side of lamp 26 via a resistor 93. The other side of lamp 26 is connected to ground.

The control point portion of the circuit 54 comes into play only when the circuitry is initially calibrated and during those times when the circuitry is conditioned for the automatic calibration mode of operation as determined by the inhibit circuit 58. Initial and automatic calibration is done with the vane 40 positioned so it does not interfere with the passage of light via the aperture 38. During the initial calibration, the light source 26 is energized by a voltage source (not shown) of selected level, for example, the rated lamp voltage. The potentiometer 65 is then adjusted so the input of the negative input for amplifier 63 is equal to the input to the positive input terminal. Should the output from the photodiode 52 subsequently vary because of a change in the response of the photodiode itself or because of a change in the intensity of the light received from lamp 26, which can be due to any number of factors, the two inputs to amplifier 63 will be different causing a signal to be presented at the output of amplifier 63. During the automatic calibration mode, the inhibit circuit 58 will permit such output to be applied to the field-effect transistor 75 causing a change in the output of amplifier 77 to change the conduction of transistor 85 and therefore the current through lamp 26 whereby the light intensity is varied. The light from lamp 26 is optically fed back by the optical sensing means 2 to th photodiode 52 so the input signals to amplifier 63 are again equal. When the calibration mode is terminated by action of the inhibit circuit 58 placing the circuitry in the scanning mode, the voltage on capacitor 66 causes the amplifier 77 to have the same output as it had when in the calibration mode, so lamp 26 continues to operate at the current level established by the calibration mode until the calibration mode is repeated by the inhibit circuit 58.

It has been indicated that during the calibration mode of operation, the vane 40 is positioned so it does not interfere with the passage of light through the aperture 36. This is accomplished when the operation of summing amplifier 20 is inhibited by the inhibit circuit 58 operating to clamp the bases of transistors 25 and 27 to ground. With transistors 25 and 27 off, transistors 23 and 29 will not conduct so coil 14, which controls the position of vane 40, will be conducting in accordance with the current from calibration current circuit 60 which as can be seen in FIG. 3 is determined by the positive voltage source (+22V) and a single resistor. The current drawn by coil is then of the proper magnitude and direction to cause vane 40 to be positioned so as to not interfere with the passage of light through the aperture 38.

The inhibiting circuit 58 includes two operational amplifiers 68 and 70. Amplifier 68 has its positive input connected to an enable signal source 64 while amplifier 70 has its negative input connected to such source. The signal from source 64 is a high signal, say 5 volts, when normal or scanning mode of operation of the mirror 10 is desired and is a low signal, say 0 volts, when the calibration mode is desired. The negative and positive inputs of amplifiers 68 and 70, respectively, are connected to receive a positive biasing voltage. Such positive voltage is obtained at the connection common to the series connected resistors 72 and 74 connected between a positive voltage source, shown as 15 volts, and ground, respectively. Each of the amplifiers 68 and 70 are resistively coupled to similar diode circuits. The output of amplifier 68 is connected via resistor 76 to the anodes of diodes 80 and 82 and to the cathodes of diodes 78 and 84. The anode of diode 78 and the cathode of diode 80 are connected to ground so diodes 78 and 80 are connected in parallel, but oppositely poled. A resistor and diodes are similarly connected to the output of amplifier 70, such elements being identified with like reference numerals to which a prime indication has been added. The cathode of diode 82 and the anode of diode 84' are each connected to circuitry 54 and specifically to the connection common to resistor 69 and diodes 71, 73. The cathode of diode 82' and the anode of diode 84 are connected to the base electrodes of transistors 25 and 27 of amplifier 20.

With the inhibiting circuit 58 described, a high or scanning mode input signal from the enable signal source 64 allows up to a +1.4 volt swing at the bases of transistors 25 and 27, which is sufficient for normal operation of mirror 10, while diodes 82 and 84' serve to prevent the flow of any current through diodes 71 and 73. At this time, slight signal variations will be presented to diodes 71 and 73, but these are not large enough to overcome the 0.7 volt required for conduction of diodes 71 and 73 so no signal from amplifiers 63 passes to the field-effect transistor 75. Accordingly, with the inhibiting circuit 58 receiving a high or scanning mode input signal from source 64, the summing amplifier circuit 20 will operate to permit mirror 10 to be positioned in accordance with signals received from input signal source 62, while operation of circuit 54 in accordance with the output from amplifier 63 is inhibited.

When a low or calibration mode signal is presented to the inhibiting circuit 58 from the enable signal source 58, the base electrodes of transistors 25 and 27 are clamped to ground to disable operation of amplifier 20, while current is allowed to pass through diodes 71 and 73 to transistor 75 permitting the current via lamp 26 to be varied as required to equalize the input signals to amplifier 63 and thereby restore the calibration of the optical sensing means 2. As has been mentioned, the output of amplifier 77 required to provide calibration is continued after the calibration mode is terminated since capacitor 66, field effect transistor 75 and amplifier 77 function as an analog memory.

The apparatus and circuitry described provide an excellent means for the control of a mirror for use in any type of instrument requiring very accurate and rapid control of a scanning or operating light beam. The beam can be directed by the use of two mirrors, one mirror for movement or direction of the beam in the x direction and the other mirror for direction of the beam in the y direction.

The apparatus and circuitry described here can also be applied to movement of other objects than the mirror described above. It can be used equally well for precise movement of a lens, diffraction grating, prism, pointer, or other device. In addition, the electro-optical sensing means described can be used to provide a feedback signal in other control apparatus wherein the shutter position is controlled in response to operation of the apparatus.

In the light of the above teachings, alternative arrangements and techniques embodying the invention will be suggested to those skilled in the art. The scope of protection afforded the invention is not intended to be limited to the specific embodiments disclosed, but is to be determined only in accordance with the appended claims.

What is claimed is:

1. Electro-optical feedback signal producing apparatus for use in a control apparatus including: a light means for providing a uniform light flux distribution, a light to electric transducer having an output at which the feedback signal is provided, a light shutter positioned with respect to said light means for receiving said uniform light flux distribution and operatively responsive to the operation of the control apparatus for controlling the passage of light via said shutter in accordance with the operation of the control apparatus and light control means positioned with respect to said light means and said light shutter for converging at said light to electric transducer the light flux presented at said light shutter.

2. Apparatus in accordance with claim 1 wherein said light control means includes a convex lens.

3. Apparatus in accordance with claim 1 wherein said control means includes a convex lens and said light means includes a light source and a concave lens with said convex lens positioned between said light shutter and said concave lens.

4. Apparatus in accordance with claim 1 wherein said light shutter includes an aperture and a vane movable in accordance with the position of the object and said aperture is shaped to provide a desired relationship between the position of said vane and the output of said light to electric transducer.

5. Apparatus in accordance with claim 1 wherein the apparatus further includes light control means positioned between said light shutter and said light to electric transducer for collecting the light passed by said shutter and presenting it to said transducer.

6. Apparatus in accordance with claim 2 wherein said light means includes a light source and said light to electric transducer is positioned at the image plane of said light source.

7. Apparatus in accordance with claim 5 wherein said light control means positioned between said light shutter and said transducer includes a concave lens.

8. Apparatus in accordance with claim 1 wherein said light control means includes a convex lens and the apparatus further includes light control means positioned between said light shutter and said light to electric transducer for collecting the light passed by said aperture and presenting it to said transducer.

9. Apparatus in accordance with claim 8 wherein said light means includes a light source and said light to electric transducer is positioned at the image plane of said light source.

10. Apparatus in accordance with claim 8 wherein said light control means positioned between said light shutter and said transducer includes a concave lens.

11. Apparatus in accordance with claim 1 wherein said light shutter has a calibration position and said apparatus includes calibration circuitry including a light control circuit connected for controlling said light means and a control point and memory circuit connected for controlling said light control circuit, said control point and memory circuit connected to receive said feedback signal for establishing a control signal for controlling said light control circuit, said control point and memory circuit connected for responding to said feedback signal only when said light shutter is in its calibration position and said control signal continuing after the calibration position of said light shutter is terminated and until such time as said light shutter is again placed in the calibration position.

\* \* \* \* \*